April 8, 1952  R. F. HAYS, JR  2,591,697
STABLE REFERENCE APPARATUS
Filed Aug. 26, 1946
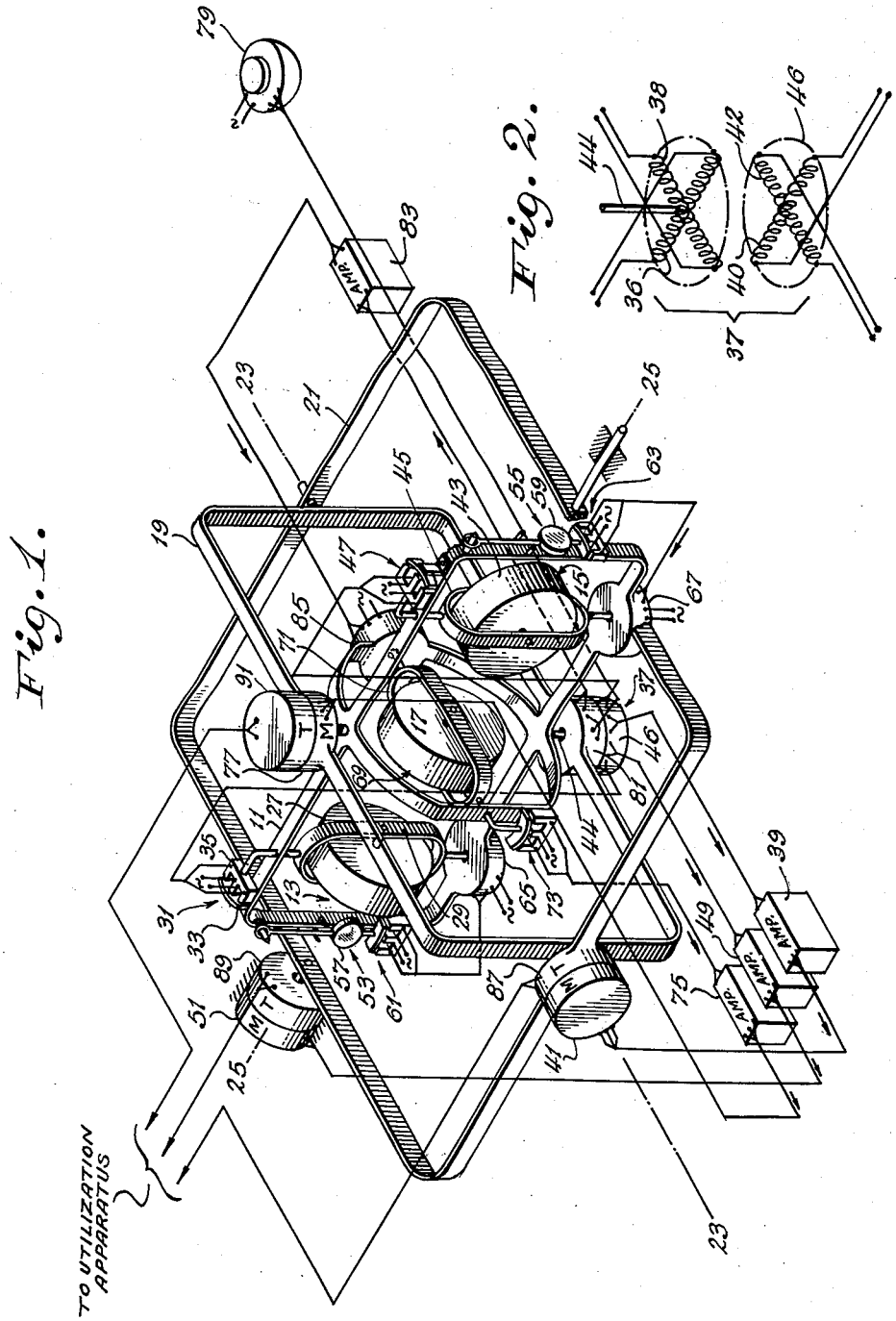
INVENTOR
ROBERT F. HAYS, JR.
BY
his ATTORNEY Patented Apr. 8, 1952

2,591,697

UNITED STATES PATENT OFFICE 2,591,697

STABLE REFERENCE APPARATUS

Robert F. Hays, Jr., Syosset, N. Y., assignor to The Sperry Corporation, a corporation of Delaware Application August 26, 1946, Serial No. 693,055

12 Claims. (Cl. 74—5.34)

The present invention relates to stable reference apparatus, and more particularly, to apparatus employing gyroscopic stability for providing an orientation reference.

It is well known that a gyroscope embodying a universally suspended mass rotated at high speed may be employed for establishing a stable reference with respect to two perpendicular axes in space, and that two gyroscopes may be employed for establishing a universal reference about three perpendicular axes. Ordinarily, a gyroscope for a stable reference about two axes embodies a spinning rotor borne in a frame pivotally mounted in a gimbal ring, which latter is in turn pivotally mounted in a fixed support, the rotor spin axis and gimbal ring pivot axes being mutually perpendicular. Variations of orientation of the body pivotally supporting the gimbal ring ordinarily are denoted by relative movements between the gimbal ring and the rotor-bearing frame, or relative movements between the gimbal ring and the body, according to the axis about which the body turns. Sensitive pick-offs have been provided at the gimbal pivot axes for transmitting orientation data signals to control devices, e. g., to an auto-pilot or to a gun-directing apparatus, for control of such devices in accordance with the changes of orientation of the body.

Although one gyroscope is usable for orientation reference about two axes, it is subject to minute changes of orientation due to disturbing forces, in such a way that errors are introduced into the data supplied to the control devices. A gyrovertical, for example, may be employed for establishing a stable reference about first and second mutually perpendicular horizontal axes, as on an aircraft. The rotor, spinning at high velocity about a vertical axis, possesses great gyroscopic rigidity. When the craft rotates about the first horizontal axis, a very small torque is exerted upon the gyroscope about the first axis through the frictional drag of the gimbal bearings. While such a torque produces substantially no rotation of the gyroscope spin axis about the first horizontal axis, it produces a minute precessional rotation of the spin axis about the second horizontal axis. An error is accordingly introduced into the signal representing craft attitude with respect to the second horizontal axis. Similarly, rotation of the craft about the second horizontal axis induces the gyro to change its orientation about the first axis, and hence produces error in the signal representing craft attitude about the first axis.

Where very high accuracy is required, these errors cannot be tolerated. Moreover, if the sensitive pick-offs exert reactionary forces upon the gyroscope, such forces are added to the bearing frictional drag forces, magnifying the data signal errors.

It is an object of the present invention to provide an improved stable reference system. More specifically, it is an important object of the present invention to provide a gyroscopic stabilization system affording extremely high accuracy, and capable of providing pick-off signals of appreciable strength without the introduction of objectional reaction error in the orientation of the gyroscope reference system.

It is a further object to provide a high performance gyroscope stable reference system arranged for minimization of orientation changes due to relative movements at the supporting bearings of the gyroscope suspension system.

Yet a further object is to provide a stable reference system characterized by extreme rigidity by virtue of reliance not only on gyroscopic momentum but also upon suspension-axis motors arranged to oppose forces tending to disturb the orientation of the reference system.

In accordance with an important feature of the present invention, a movably supported frame to be stabilized about predetermined axes in space is provided with a gyroscope arranged for stabilization about each such axis. The gyroscope itself affords stiffness about the axis for which it is intended to afford stabilization, firmly resisting rotation about such axis but responding with a precessional rotation about its gimbal axis to disturbing torques which otherwise would cause a change of orientation of the frame. The precessional response is employed through amplifier and motor apparatus to counterbalance the disturbing forces about the predetermined axis. Where stabilization about three axes is desired, three gyroscopes may be pivotally mounted within the stabilization frame, and arranged to afford advantages of mutual stabilization, with freedom from gimbal error, and with extremely high rigidity in space of the movable common supporting frame for the three gyroscopes.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above objects and features will become more clearly apparent, and other objects will be recognized, from the following description of a preferred embodiment of the present invention, as illustrated in the drawing, wherein Fig. 1 illustrates a universal stabilization apparatus embodying the features of the present invention, and Fig. 2 illustrates details of an azimuthal transformation device included in the universal stabilization apparatus.

In Fig. 1 is shown a frame 11 universally suspended for freedom about three mutually perpendicular axes, and provided with three gyroscopes 13, 15 and 17 for detection of and opposition to forces tending to disturb the orientation of the principal frame 11. Frame 11 is illustrated as pivotally supported for freedom about the vertical axis in a Cardan suspension element 19. Element 19 is illustrated as pivotally supported for freedom about a first horizontal axis 23—23 in a further Cardan suspension element 21. Cardan suspension element 21, in turn, is pivotally supported, as by bearings installed in a craft, for freedom about a second normally horizontal axis 25—25, perpendicular to axis 23—23.

Gyroscopes 13 and 15 are provided for affording stabilization of frame 11 about the mutually perpendicular horizontal axes, and gyroscope 17 is arranged to stabilize frame 11 about the vertical axis. Gyroscope 13 embodies a rotor 27 supported for rotation about a horizontal axis in a rotor-bearing frame 29 which, in turn, is pivotally supported about a vertical gimbal journal axis in the principal frame 11. The rotor-bearing frame 29, while diagrammatically illustrated as an open ring, may be a rotor casing completely enclosing the rotor 27. Motive means (not shown) are provided for driving or spinning the rotor 27 in high speed rotation. For this purpose, an electric motor may be incorporated with a stator fixed to frame 29 and a rotor attached to or forming part of gyroscope rotor 27. Such well known constructional features are similarly applicable to gyroscopes 15 and 17.

Gyroscope 13 affords rigidity to oppose rotation about the horizontal axis perpendicular to its rotor axis. With the relative orientations of frame 11 and element 19 as illustrated in Fig. 1, gyroscope 13 affords stabilization of frame 11 merely about axis 23—23. Any forces tending to change the orientation of frame 11 about axis 23—23, e. g., bearing frictional forces transmitted through the bearings of the Cardan suspension system when the supporting body or craft revolves about the axis 23—23, are opposed by the gyroscopic rigidity resulting from high speed rotation of the rotor 27; but such forces result in such precession of the gyroscope 13 that the rotor-bearing frame 29 commences to revolve very gradually about the vertical gimbal journal axis relative to the principal frame 11.

Sensitive pick-off apparatus schematically indicated at 31 as an "E" pick-off, embodying a signal transformer unit having relatively movable core portions 33 and 35 provided with a neutrally positioned primary winding and series-opposed secondary windings, in accordance with the teachings of U. S. Patent 1,959,804 to Wittkuhns et al., is provided for supplying an output signal of phase and magnitude denoting the direction and extent of angular displacement developed between the rotor-bearing frame 29 and the principal frame 11. The opposed secondary windings of the pick-off 31 are coupled, as through a transformation device 37 and an amplifier 39 to a suspension axis motor 41 coupled to suspension elements 19 and 21. The device 37, the amplifier 39 and the motor 41 are so connected and arranged that the motor 41 exerts a torque in the direction producing precession of gyroscope 13 to overcome the relative displacement between the parts 33 and 35 of pick-off 31, and thus to prevent prolonged exertion of any net disturbing force on the frame 11 about the axis perpendicular to the spin axis of rotor 27.

The second gyroscope 15 similarly embodies a rotor 43 supported for rotation in a rotor-bearing frame 45 which is journaled in a vertical journal axis in the principal frame 11. A second sensitive pick-off 47, which also may be of the "E" type, is provided for supplying an output signal upon precessional departures of the second gyroscope 15 from a predetermined orientation relative to the supporting frame 11. The second pick-off 47 is coupled through the transformation device 37 and a second amplifier 49 to a motor 51 arranged to oppose any forces tending to disturb the orientation of frame 11 about axis 25—25. It will be apparent that amplifiers 39 and 49 and motors 41 and 51 not only prevent disturbing forces from exerting prolonged effect upon the principal frame 11, but also act to retain gyroscopes 13 and 15 in their predetermined respective orientations relative to frame 11.

The transformation device 37 is a variable transformer arrangement (Fig. 2) having two primary windings 36 and 38 and two secondary windings 40 and 42. The primary windings 36 and 38, arranged for freedom from mutual coupling therebetween, may be mounted on a rotary member 44; while the secondary windings 40 and 42, similarly arranged as in quadrature positional relation for freedom from mutual coupling, are fixed to the cooperating member 46. When the frame 11 and Cardan suspension element 19 occupy the relative positions in which they are shown in Fig. 1, the primary winding 36 which is connected to pick-off 31 is closely coupled to the secondary winding 40 which is connected to the input circuit of amplifier 39; and windings 38 and 42 similarly provide maximum coupling between pick-off 47 and the input circuit of amplifier 49. But if the relative positions of frame 11 and element 19 are changed through a 90° extent, so that windings 36 and 38 are rotated 90° relative to windings 40 and 42, then the mutual coupling between windings 36 and 40 and between windings 38 and 42 is eliminated, being supplanted by maximum mutual coupling between windings 36 and 42 and between windings 38 and 40. Then pick-off 31 is coupled only to the circuit including amplifier 49 and motor 51, and pick-off 47 is coupled only to amplifier 39 and motor 41. Such an interchange of coupling relations of the pick-offs and the suspension motors is required to maintain proper coordination of the associated gyroscope axes and suspension motor axes, so that the suspension motor which responds to an angular displacement of a gyroscope about its gimbal journal axis is the motor positioned to apply the torque necessary to restore that gyroscope to its neutral position.

For intermediate changes of relative positions of frame 11 and suspension element 19, each primary winding is coupled to corresponding intermediate extents to both secondary windings 40 and 42, so that departure of a horizontal-axis stabilization gyroscope from its neutral position results in the production of appropriate torque components in both horizontal-axis motors 41 and 51.

The transformation device 37 may be a unit of the type commercially known as a "Resolver," as for example the Pioneer Autosyn type AY131.

Gravity responsive devices 53 and 55, which may incorporate pendulous elements 57 and 59, respectively, arranged in conjunction with pick-off units such as "E" pick-offs 61 and 63, may be provided for detection of departure of the frame 11 from a predetermined orientation about axes 23—23 and 25—25, respectively. These gravity reference devices 53 and 55 are respectively coupled to gimbal journal axis torque motors 65 and 67 arranged for application of torques about the gimbal journal axes in the directions to produce precession of the gyroscopes 13 and 15, respectively, as required to maintain the frame 11 in its predetermined orientation in space, e. g., with the axis of the supporting bearings of frame 11 vertical.

The third gyroscope 17 is arranged to afford stiffness or rigidity to frame 11 about the vertical axis. This gyroscope 17 includes a rotor 69 supported for rotation about a horizontal axis in a rotor-bearing frame 71, which, in turn, is pivoted for freedom about a third gimbal journal axis in the frame 11. Gyroscope 17 is similarly provided with a precession-responsive pick-off 73 coupled through an amplifier 75 to a vertical-axis torque motor 77. In this arrangement, gyroscope 17, while rigidly opposing forces tending to rotate frame 11 about the vertical axis, responds to these forces with precession about its horizontal gimbal journal axis, and as a result, motor 77 is actuated to oppose the disturbing forces, and to restore gyroscope 17 to its neutral orientation in frame 11.

Supervisory control over the azimuthal orientation of the principal reference frame 11 may be exerted by a directional reference unit 79, e. g., a magnetic field-responsive instrument such as a magnetic compass arranged as with an internal self-synchronous positional signal transmitter electrically connected to a further self-synchronous positional signal device 81 for supplying azimuthal corrective signals to an amplifier 83 coupled to a gimbal journal torque motor 85. The torque exerted by motor 85 is always directed to produce precession of gyroscope 17 in the direction to bring frame 11 into azimuthal alignment with the sensitive element of directional unit 79. This torque is preferably limited to a very low value, preventing the introduction of appreciable error into the azimuthal orientation of frame 11 in response to momentary errors in azimuthal position of the sensitive element of unit 79.

Remote positional transmitter units 87, 89 and 91 may be provided for supplying craft or body orientation reference signals to utilization apparatus such as a gunfire control system or a craft attitude control system such as an aircraft auto-pilot.

With the arrangement of elements as illustrated in Fig. 1, it will be apparent that even if suspension torque motors 41, 51 and 91 were inoperative for a brief period of time, the gyroscopes 13, 15 and 17 would oppose any rapid changes of orientation of the principal reference frame 11. However, disturbing torques exterted upon frame 11 would cause precessions of the gyroscopes about their respective gimbal journal axes, and if prolonged would eventually upset the desired mutual orientation relationships among the stabilization gyroscopes. This is particularly true in instances where the transmitter units 87, 89, and 91 are required to be of such size and signal output capacity that they tend materially to interfere with the freedom of the gyroscope suspension system. According to an important feature of the present invention, any disturbing torque affecting the principal frame 11 to such an extent as to cause even minute precession of one of the gyroscopes supported therein not only is opposed immediately by the gyroscopic stiffness of that gyroscope, but also is opposed by the powerful suspension torque motor coupled through an amplifier to receive the signal provided by the precession pick-off unit associated with the gyroscope. The torque motor provides its opposing torque for the duration of the disturbing force, and sufficiently longer to cause precession of the gyroscope back to its neutral position. Consequently, net effects of the disturbance both on the space orientation of frame 11 and on the relative displacement between the frame and the disturbance-opposing gyroscope are substantially cancelled.

Not only is the stability and accuracy of the gyroscope orientation reference system greatly enhanced by this arrangement, but also it is rendered relatively free from vulnerability to reaction torques experienced with the positional transmitters 87, 89 and 91. Moreover, the gyroscopes 13 and 15 which act to stabilize the frame 11 about the horizontal axes are arranged for freedom from error resulting from axial shifts in rotor or gimbal bearings of the center of gravity of the rotor or rotor-bearing frame.

In this stable reference apparatus, the Cardan suspension torque motors 41, 51 and 77 and their associated amplifiers 39, 49 and 75 need not meet any such exacting requirements as are ordinarily associated with servo systems requiring prompt and accurate positional follow-up action. With a readily provided torque system, the gyroscopes 13, 15 and 17 are prevented from precession farther than through an angular displacement of the order of a degree, with a prolonged rotation of the craft about any axis; and accordingly, the principal reference frame 11 may be compressed into a layout of extreme compactness. For example, the horizontal diameters of the rotors 27, 43 and 69 may be arranged in a configuration corresponding to the legs and hypotenuse, respectively, of a horizontal isosceles right triangle.

Throughout the drawing, the electrical circuit connections have been schematically indicated as extending directly between the electrically interconnected parts of the apparatus. In practice, however, slip rings and brushes are provided at the journals of intermediate suspension elements, and the conductors are arranged in cable sections extending around the Cardan suspension elements between successive journals. Such details of circuit arrangements are well known, as are also the provisions of pneumatic or fluid drive and fluid torque systems which may be employed if desired.

While gyroscopes 13 and 15 have been illustrated as having horizontal rotor axes and vertical gimbal journal axes, the present invention broadly contemplates the arrangement of rotor-bearing axis and gimbal journal axis both transverse and preferably substantially perpendicular to the axis about which the gyroscope is to afford rigidity to the frame 11. Accordingly, wide latitude is available in fixing the orientation of each gyroscope.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Stable reference apparatus comprising: a principal frame to be stabilized in space about first and second mutually perpendicular major axes and for the establishment of a third major axis perpendicular to said first and second major axes; a first gyroscope coupled to said frame for detecting and resisting forces tending to disturb the space orientation of said principal frame about said first major axis, said gyroscope comprising a first rotor-bearing frame journaled in said principal frame for freedom about a first gimbal journal axis perpendicular to said first major axis, and a first rotor supported in said first rotor-bearing frame to spin therein about an axis perpendicular to said first gimbal journal axis and normally perpendicular to said first major axis; a second gyroscope coupled to said frame for detecting and resisting forces tending to disturb the space orientation of said principal frame about said second major axis, said second gyroscope comprising a second rotor-bearing frame journaled in said principal frame for freedom about a second gimbal journal axis perpendicular to said second major axis, and a second rotor supported in said second rotor-bearing frame to spin therein about an axis perpendicular to said second gimbal journal axis and normally perpendicular to said second major axis; means including a gravity-reference responsive to inclination of said principal frame from a normal position about said first major axis for applying a torque to said first rotor-bearing frame about said first gimbal journal axis in the direction to produce precession of said first gyroscope tending to overcome said inclination about said first major axis; and means including a gravity-reference responsive to inclination of said principal frame from a normal position about said second major axis for applying a torque to said second rotor-bearing frame about said second gimbal journal axis in the direction to produce precession of said second gyroscope tending to overcome said inclination of said principal frame about said second major axis.

2. Stable reference apparatus comprising: a principal frame to be stabilized in space about first and second mutually perpendicular major axes; a first gyroscope coupled to said frame for detecting and resisting forces tending to disturb the space orientation of said principal frame about said first major axis, said gyroscope comprising a first rotor-bearing frame journaled in said principal frame for freedom about a first gimbal journal axis perpendicular to said first major axis, and a first rotor supported in said first rotor-bearing frame to spin therein about an axis perpendicular to said first gimbal journal axis and normally perpendicular to said first major axis; a second gyroscope coupled to said frame for detecting and resisting forces tending to disturb the space orientation of said principal frame about said second major axis, said second gyroscope comprising a second rotor-bearing frame journaled in said principal frame for freedom about a second gimbal journal axis perpendicular to said second major axis, and a second rotor supported in said second rotor-bearing frame to spin therein about an axis perpendicular to said second gimbal journal axis and normally perpendicular to said second major axis; means responsive to relative displacement between said first rotor-bearing frame and said principal frame about said first gimbal journal axis for applying a torque to said principal frame about said first major axis in the direction to suppress said relative displacement about said first gimbal journal axis; means responsive to relative displacement between said second rotor-bearing frame and said principal frame about said second gimbal journal axis for applying a torque to said principal frame about said second major axis in the direction to suppress said relative displacement about said second gimbal journal axis; means including a gravity-reference responsive to deviation of said principal frame from a predetermined orientation about said first major axis for applying a torque to said first rotor-bearing frame about said first gimbal journal axis in the direction to produce precession of said first gyroscope tending to overcome said deviation about said first major axis; and means including a gravity-reference responsive to deviation of said principal frame from a predetermined orientation about said second major axis for applying a torque to said second rotor bearing frame about said second gimbal journal axis in the direction to produce precession of said second gyroscope tending to overcome said deviation about said second major axis.

3. Stable reference apparatus as defined in claim 2, wherein said first and second major axes are substantially horizontal; and said means responsive to deviation about said major axes for applying torques to said rotor-bearing frames comprise first and second journal torque motors on said first and second gyroscopes, respectively, arranged for exerting torques about the respective gimbal journal axes thereof, and said gravity-references are coupled to said principal frame and include electrical pick-offs for supplying said journal torque motors with actuating currents dependent upon the orientation of said principal frame relative to the direction of gravitational force.

4. Stable reference apparatus comprising: a principal frame to be stabilized in space about first, second and third mutually perpendicular major axes; a first gyroscope coupled to said principal frame for detecting and resisting forces tending to disturb the space orientation of said principal frame about said first major axis, said first gyroscope comprising a first rotor-bearing frame journaled in said principal frame for freedom about a first gimbal journal axis, and a first rotor supported in said first rotor-bearing frame to spin therein about an axis perpendicular to said first gimbal journal axis and normally perpendicular to said first major axis; a second gyroscope coupled to said principal frame for detecting and resisting forces tending to disturb the space orientation of said principal frame about said second major axis, said second gyroscope comprising a second rotor-bearing frame journaled in said principal frame for freedom about a second gimbal journal axis perpendicular to said second major axis, and a second rotor supported in said second rotor-bearing frame to spin therein about an axis perpendicular to said second gimbal journal axis and normally perpendicular to said second major axis; a third gyroscope coupled to said frame for detecting and resisting forces tending to disturb the space orientation of said principal frame about said third major axis, said third gyroscope comprising a third rotor-bearing frame journaled in said principal frame for freedom about a third gimbal journal axis perpendicular to said third major axis, and a third rotor supported in said third rotor-bearing frame to spin therein about an axis perpendicular to said third gimbal journal axis and normally perpendicular to said third major axis; means including a gravity-reference responsive to deviation of said principal bearing frame from a predetermined orientation about said first major axis for applying a torque to said first rotor-bearing frame about said first gimbal journal axis tending to produce precession of said first gyroscope in the direction opposing said deviation about said first major axis; means including a gravity reference responsive to deviation of said principal frame from a predetermined orientation about said second major axis for applying a torque to said second rotor-bearing frame about said second gimbal journal axis tending to produce precession of said second gyroscope in the direction to oppose said deviation about said second major axis; and means responsive to deviation of said principal frame from a predetermined orientation about said third major axis for applying a torque to said third rotor-bearing frame about said third gimbal journal axis tending to produce precession of said third gyroscope in the direction to oppose said deviation about said third major axis.

5. Stable reference apparatus as defined in claim 4, wherein said first and second major axes are horizontal, and said means responsive to deviation about said third major axis includes an azimuth reference apparatus for detecting the deviation.

6. Stable reference apparatus comprising: a principal frame to be stabilized in space about first and second mutually perpendicular major axes; means coupled to said principal frame for resisting forces tending to disturb the space orientation of said principal frame about said first major axis; a gyroscope coupled to said principle frame for detecting and resisting forces tending to disturb the space orientation of said principal frame about said second major axis, said gyroscope comprising a rotor-bearing frame journaled in said principal frame for freedom about a gimbal journal axis transverse said second major axis, and a rotor supported in said rotor-bearing frame to spin therein about an axis transverse said gimbal journal axis and normally transverse said second major axis; means responsive to relative angular displacement between said rotor axis and said principal frame from a predetermined relative orientation about said gimbal journal axis for exerting a torque upon said principal frame about said second major axis tending to oppose said relative angular displacement; and means including a gravity-reference responsive to deviation of said principal frame from a predetermined space orientation about said second major axis for exerting a torque upon said gyroscope about said gimbal journal axis in the direction tending to overcome said deviation.

7. Stable reference apparatus comprising: a principal frame to be stabilized in space; first and second pivotally connected Cardan suspension elements pivotally supporting said principal frame for freedom about three mutually transverse axes, said principal frame being pivotally connected to said first Cardan element for freedom about a first suspension axis, said first and second Cardan elements being pivotally interconnected about a second suspension axis transverse said first suspension axis for imparting to said first element and said principal frame freedom about said second suspension axis, and said second Cardan element being pivotally supported for freedom about a third suspension axis transverse a plane through said first suspension axis parallel to said second suspension axis; means coupled to said principal frame for resisting forces tending to disturb the space orientation of said frame about said first suspension axis, a gyroscope coupled to said principal frame for detecting and resisting forces tending to disturb the space orientation of said principal frame about a major axis transverse said first suspension axis, said gyroscope comprising a rotor-bearing frame journaled in said principal frame for freedom about a gimbal journal axis transverse to said major axis, and a rotor supported in said rotor-bearing frame to spin therein about an axis transverse said gimbal journal axis and normally transverse said major axis; and means responsive to relative displacement between said rotor-bearing frame and said principal frame about said gimbal journal axis for exerting a torque upon said principal frame about said major axis in the direction to oppose said displacement, said last named means comprising first motive means for applying a torque to said first Cardan element about said second suspension axis, means for applying a torque to said second Cardan element about said third suspension axis, and torque distribution controlling means responsive to relative displacement between said principal frame and said first Cardan element about said first suspension axis and intercoupling said gyroscope with said first and second torque applying means according to the relative orientation of said gyroscope and said second and third suspension axes.

8. Stable reference apparatus comprising: a principal frame to be stabilized in space; first and second pivotally connected Cardan suspension elements pivotally supporting said principal frame for freedom about three mutually transverse axes, said principal frame being pivotally connected to said first Cardan element for freedom about a first suspension axis, said first and second Cardan elements being pivotally interconnected about a second suspension axis transverse said first suspension axis for imparting to said first element and said principal frame, freedom about said second suspension axis, and said second Cardan element being pivotally supported for freedom about a third suspension axis transverse said first and second suspension axes; means coupled to said principal frame for resisting forces tending to disturb the space orientation of said frame about said first suspension axis; a first gyroscope coupled to said principal frame for detecting and resisting forces tending to disturb the space orientation of asid principal frame about a first major axis, said gyroscope comprising a first rotor-bearing frame journaled in said principal frame for freedom about a first gimbal journal axis transverse said first major axis, and a first rotor supported in said first rotor-bearing frame to spin therein about an axis transverse said first gimbal journal axis and normally transverse said first major axis; a second gyroscope coupled to said principal frame for detecting and resisting forces tending to disturb the space orientation of said principal frame about said second major axis, said second gyroscope comprising a second rotor-bearing frame journaled in said principal frame for freedom about a second gimbal journal axis transverse said second major axis, a second rotor supported in said second rotor-bearing frame to spin therein about an axis transverse said second gimbal journal axis and normally transverse said second major axis; first motive means for exerting a torque upon said principal frame about said second suspension axis, second motive means for exerting a torque upon said principal frame about said third suspension axis; and means responsive to relative rotations between said principal frame and said first gyroscope about said first gimbal axis and to relative rotation between said principal frame and said second gyroscope about said second gimbal journal axis for activating said first and second motive means to apply a resultant torque to said principal frame in the direction to oppose said relative rotations, said means comprising a variable transformer device coupled to said principal frame and said first Cardan suspension element and intercoupling said first and second motive means with said gyroscope rotation responsive means for resolving the actuation components about said second and third suspension axes according to the relative positions of said principal frame and said first Cardan suspension element about said first suspension axis.

9. Stable reference apparatus comprising, a principal frame to be stabilized in space, a first Cardan suspension element pivotally supporting said frame for freedom about a first axis, a second Cardan suspension element pivotally supporting said first element for freedom about a second axis transverse said first axis, means for pivotally supporting said second element for freedom about a third axis transverse said first and second axes, means responsive to force tending to change the orientation of said frame about said first axis for exerting a torque between said frame and said first suspension element opposing said force, means on said frame for detecting forces tending to disturb the orientation of said frame about mutually transverse axes transverse said first axis, means for exerting a corrective torque about said second axis between said first suspension element and said second suspension element, means for exerting a corrective torque on said second suspension element tending to turn said second element about said third axis, and variable coupling transposition means connected to said frame and to said first suspension element and actuated according to the variation of relative positions of said frame and said first suspension element for variably coupling said force detecting means to both said corrective torque exerting means.

10. Stable reference apparatus comprising: a principal frame to be stabilized in space about first, second and third mutually perpendicular major axes; a first gyroscope coupled to said frame for detecting and resisting forces tending to disturb the space orientation of said principal frame about said first major axis, said first gyroscope comprising a first rotor-bearing frame journaled in said principal frame for freedom about a first gimbal journal axis perpendicular to said first major axis, and a first rotor supported in said rotor-bearing frame to spin therein about an axis perpendicular to said first gimbal journal axis and normally perpendicular to said first major axis; a second gyroscope coupled to said frame for detecting and resisting forces tending to disturb the space orientation of said principal frame about said second major axis, said second gyroscope comprising a second rotor-bearing frame journaled in said principal frame for freedom about a second journal axis perpendicular to said second major axis, and a second rotor supported in said second rotor-bearing frame to spin therein about an axis perpendicular to said second gimbal journal axis and normally perpendicular to said second major axis; and a third gyroscope coupled to said frame for detecting and resisting forces tending to disturb the space orientation of said principal frame about said third major axis, said third gyroscope comprising a third rotor-bearing frame journaled in said principal frame for freedom about a third gimbal journal axis perpendicular to said third major axis and a third rotor supported in said third rotor-bearing frame to spin therein about an axis perpendicular to said third gimbal journal axis and normally perpendicular to said third major axis, said apparatus further including gravity reference means responsive to deviations of said principal frame from a predetermined orientation about said first and second axes for applying erection torques to said first and second gyroscopes, and magnetic field reference means responsive to deviation of said principal frame from a predetermined orientation about said third axis for applying an azimuth precession torque to said third gyroscope to suppress said deviation about said third axis.

11. Stable reference apparatus comprising a frame mounted with three mutually perpendicular axes of freedom, three gyroscopes supported on said frame having different perpendicularly arranged spin and precession axes, signal means on said frame for detecting movements of said gyroscopes about the respective precession axes thereof, means for exerting corrective torques on said frame in accordance with the signals of the respective detecting means therefor, means for orienting two of said gyroscopes including a gravity-reference, and means for orienting the third gyroscope including an azimuth reference device.

12. Stable reference apparatus comprising, a principal frame, a first Cardan suspension element pivotally supporting said frame for freedom about a normally vertical axis, a second Cardan suspension element pivotally supporting said first element for freedom about a normally horizontal axis, means for pivotally supporting said second element for freedom about a second normally horizontal axis perpendicular to said first horizontal axis, means for maintaining the frame oriented in space about said vertical axis, gyroscopic means for maintaining the orientation of said frame about said horizontal axes, means for detecting departure of the orientation of said frame relative to said gyroscopic means, means for exerting a corrective torque about the first horizontal axis of the frame, means for exerting a corrective torque about the second horizontal axis of the frame, and variable coupling transposition means connected to said frame and to said first suspension element for coupling said detecting means to both said corrective torque exerting means.

ROBERT F. HAYS, JR.

REFERENCES CITED

The following references are of record in the file of this patent:

UNITED STATES PATENTS

| Number | Name | Date |
|---|---|---|
| 1,253,666 | Carrie | Jan. 15, 1918 |
| 1,446,348 | Hort | Feb. 20, 1923 |
| 1,501,886 | Abbot | July 15, 1924 |
| 1,930,082 | Boykow | Oct. 10, 1933 |
| 2,008,058 | Boykow | July 16, 1935 |
| 2,405,058 | Ross | July 30, 1946 |
| 2,414,291 | Evans | Jan. 14, 1947 |

FOREIGN PATENTS

| Number | Country | Date |
|---|---|---|
| 337,828 | Great Britain | Nov. 10, 1930 |